(12) United States Patent
Hornak

(10) Patent No.: US 7,742,605 B2
(45) Date of Patent: Jun. 22, 2010

(54) METHOD AND SYSTEM FOR AUTHENTIFICATION OF A MOBILE USER VIA A GATEWAY

(75) Inventor: Zoltan Hornak, Veszprem (HU)

(73) Assignee: Nokia Corporation, Espoo (FI)

( * ) Notice: Subject to any disclaimer, the term of this patent is extended or adjusted under 35 U.S.C. 154(b) by 580 days.

(21) Appl. No.: 10/362,017

(22) PCT Filed: Aug. 6, 2001

(86) PCT No.: PCT/FI01/00695

§ 371 (c)(1),
(2), (4) Date: Dec. 8, 2003

(87) PCT Pub. No.: WO02/15523

PCT Pub. Date: Feb. 21, 2002

(65) Prior Publication Data

US 2004/0103283 A1    May 27, 2004

(30) Foreign Application Priority Data

Aug. 18, 2000   (FI) .................................. 20001837

(51) Int. Cl.
*H04L 9/00*   (2006.01)
*H04L 29/06*   (2006.01)
*H04L 9/32*   (2006.01)

(52) U.S. Cl. .................. 380/277; 713/155; 713/156; 713/157; 713/173; 713/175; 726/12; 726/13; 726/14

(58) Field of Classification Search .................. 713/175, 713/155–157, 173; 726/12–14
See application file for complete search history.

(56) References Cited

U.S. PATENT DOCUMENTS

| | | | | |
|---|---|---|---|---|
| 5,371,794 A * | 12/1994 | Diffie et al. | .................. | 713/156 |
| 5,915,087 A * | 6/1999 | Hammond et al. | ............ | 726/12 |
| 6,012,100 A * | 1/2000 | Frailong et al. | ............. | 709/250 |
| 6,094,578 A * | 7/2000 | Purcell et al. | ............ | 455/426.1 |
| 6,178,409 B1 * | 1/2001 | Weber et al. | .................. | 705/79 |

(Continued)

FOREIGN PATENT DOCUMENTS

EP   1094682   4/2001

(Continued)

*Primary Examiner*—William R Korzuch
*Assistant Examiner*—Trang Doan
(74) *Attorney, Agent, or Firm*—Banner & Witcoff Ltd.

(57) ABSTRACT

A system and method for establishing secure communications between two entities, such as a server and a client, may involve the use of an intermediate gateway. Each party may establish a secure communication link with the gateway, and the gateway may provide signed certificates to each party, each certificate identifying the gateway as the other party for purposes of the communication. The gateway may then facilitate the secure communications between the two parties, and may perform data translation on the communications. The identification information may be contained within the certificates used by the gateway.

22 Claims, 5 Drawing Sheets

U.S. PATENT DOCUMENTS

Figure 1:
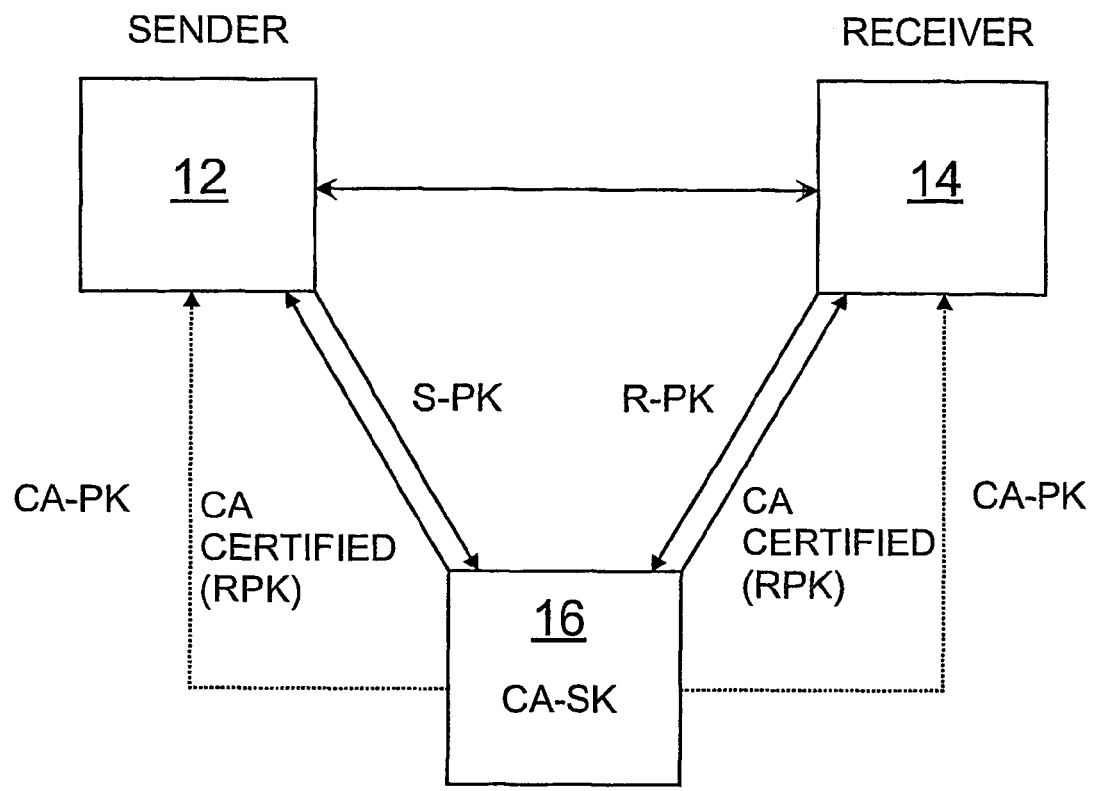

| | | | |
|---|---|---|---|
| 6,192,131 B1 * | 2/2001 | Geer et al. | 380/283 |
| 6,233,577 B1 * | 5/2001 | Ramasubramani et al. | 707/9 |
| 6,336,137 B1 * | 1/2002 | Lee et al. | 709/219 |
| 6,370,249 B1 * | 4/2002 | Van Oorschot | 380/277 |
| 6,430,624 B1 * | 8/2002 | Jamtgaard et al. | 709/246 |
| 6,442,687 B1 * | 8/2002 | Savage | 713/156 |
| 6,453,174 B1 * | 9/2002 | Cunningham et al. | 455/560 |
| 6,463,534 B1 * | 10/2002 | Geiger et al. | 713/168 |
| 6,553,493 B1 * | 4/2003 | Okumura et al. | 713/170 |
| 6,643,701 B1 * | 11/2003 | Aziz et al. | 709/227 |
| 6,701,303 B1 * | 3/2004 | Dunn et al. | 705/75 |
| 6,789,188 B1 * | 9/2004 | Epstein et al. | 713/155 |
| 6,823,373 B1 * | 11/2004 | Pancha et al. | 709/219 |
| 7,194,759 B1 * | 3/2007 | Chess et al. | 726/2 |
| 7,237,261 B1 * | 6/2007 | Huber et al. | 726/12 |
| 7,275,262 B1 * | 9/2007 | Habert | 726/26 |
| 2001/0011255 A1 * | 8/2001 | Asay et al. | 705/76 |
| 2001/0016907 A1 | 8/2001 | Kang et al. | |

FOREIGN PATENT DOCUMENTS

| | | |
|---|---|---|
| EP | 1111870 | 6/2001 |
| WO | 00/02358 | 1/2000 |
| WO | WO 00/02358 | 1/2000 |
| WO | 01/54374 | 7/2001 |

* cited by examiner

METHOD AND SYSTEM FOR AUTHENTIFICATION OF A MOBILE USER VIA A GATEWAY

The invention relates to authentication and is particularly, but not exclusively, related to a communications system. In one embodiment it relates to a wireless communications system.

Communication over the Internet uses the TCP/IP Protocol Family. TCP refers to Transport Control Protocol and IP refers to Internet Protocol. TCP/IP refers to a large set of protocols specified by the Internet Engineering Task Force (IETF). TCP/IP is the basic Internet and intranet communications protocol. It allows information to be sent from one computer to its destination through intermediate devices and separate networks.

The great flexibility of TCP/IP has led to its worldwide acceptance. At the same time, the fact that TCP/IP allows information to pass through intermediate devices makes it possible for a third party to interfere with communications in the following ways:

Eavesdropping. Information remains intact, but its privacy is compromised. For example, a third party can discover credit card details or intercept classified information.

Tampering. Information in transit is altered and then sent on to an intended recipient. For example, a third party can alter an order for goods.

Impersonation. Information passes to a third party which poses as an intended recipient. Impersonation can involve the third party pretending to be someone else or misrepresenting itself as a real organization when it is not. For example the third party could represent itself as a merchant and accept payments without sending any goods.

Although these problems exist in wired environments, they are of particular concern in wireless environments, since third parties can receive wireless transmissions and make other wireless transmissions independently of a fixed location.

Encryption (cryptography) is used to deal with these problems. Encryption enables information to be rendered confidential so that it is unintelligible to an eavesdropper. In this way it provides privacy. A recipient can verify that information has not been modified in transit or detect when it has been modified. A recipient can determine that information originates from its purported source, and so can be authenticated. In addition, encryption can provide non-repudiation which prevents a sender of information from claiming at a later date that it did not send the information.

One form of encryption is symmetric-key encryption. In symmetric-key encryption, an encryption key can be calculated from a decryption key and vice versa. With most symmetric algorithms, the same key is used for both encryption and decryption. Implementations of symmetric-key encryption can be highly efficient, so that users do not experience any significant time delay as a result of the encryption and decryption procedures. Symmetric-key encryption also provides a degree of authentication, since information encrypted with one symmetric key cannot be decrypted with any other symmetric key.

Symmetric-key encryption is effective only if the symmetric keys are kept secret by the two parties involved. If anyone else discovers the keys, it affects both confidentiality and authentication. A person with an unauthorized symmetric key not only can decrypt messages sent with that key, but also can encrypt new messages and send them as if they came from one of the two parties who were originally using the key.

Another form of encryption is public-key encryption. One version of public-key encryption is based on algorithms of RSA Data Security. Public-key encryption (also called asymmetric encryption) involves a pair of keys, a public key and a private key, associated with a party that needs to authenticate its identity electronically or to sign or to encrypt data. The public key must be authentic. A public key may be published, while the corresponding private key must be kept secret. A message encrypted by using the public key and the encryption algorithm can only be decrypted by using the private key. Therefore if a party has been given the public key, it can use this key to encrypt messages which can only be decrypted by using the private key. In this way, privacy or confidentiality is provided. Conversely, a message encrypted by using the private key can only be decrypted by using the public key. Therefore, if a party has the private key, the party can use this key to encrypt messages which can be decrypted by another party having the public key. Messages which can be decrypted with the public key can only come from a party possessing the corresponding private key. In this way, authentication or signature is provided.

Clearly it is important to ensure that any public key comes from its purported source. For example, a sender may generate a private and public key pair and send the public key to a receiver so that the receiver can be certain that messages signed by the private key are from the sender. However, if a third party intercepts the sender's public key and substitutes a public key from a private and public key pair of its own, then the third party can intercept messages from the sender, open them with the sender's public key and then alter them and digitally sign them with its own private key. On receiving such a digitally signed message the receiver will believe that it comes from the sender. This does not just apply to altered messages, but also applies to impersonation, that is a third party can send messages which are wholly fabricated.

To deal with this problem a certification authority is used as is shown in FIG. 1. This arrangement shows a sender 12, a receiver 14 and a certification authority (CA) 16. The CA 16 is connected to the sender 12 and the receiver 14 and trusted by them both. The sender 12 has a private key (S-SK) and a public key (S-PK), the receiver 14 has a private key (R-SK) and a public key (R-PK) and the CA has a private key (CA-SK) and a public key (CA-PK). The CA-PK is provided to both the sender 12 and the receiver 14 in order for authenticated communication to occur. Clearly, the CA-PK must be provided in an authenticated way so that the sender 12 and the receiver 14 can be certain of its source.

The sender 12 generates a certificate-signing request (CSR), which is sent to the CA 16. The sender 12 proves its identity to the CA 16 (either by a user of the sender 12 sending some personal data or by a private code being used which is present in the sender 12). The sender 12 also sends its public key S-PK within the CSR. The CA 16 signs the personal data or the private code and the public key S-PK together with a unique digital signature in order to prove that they correspond. The signed certificate is returned to the sender 12. The receiver 14 carries out a similar procedure with the CA 16 in order to obtain its own signed certificate. When the sender 12 wants to talk to the receiver 14, a handshake between them is required in which the sender 12 and the receiver 14 exchange their digital certificates (this exchange is not encrypted).

The sender 12 and the receiver 14 can then verify the received signed certificates by using the CA-PK to ensure that they were authenticated by the CA 16 and so can be trusted. Since the sender 12 and the receiver 14 now each have the public key of the other, confidential and authenticated communication can take place. In reality the sender 12 and the receiver 14 may send an authenticated certificate (discussed below) rather than only sending authenticated public keys.

Generally CAs are arranged in a hierarchy originating from a common root. This hierarchy is called the public key infrastructure. This means that CAs can be authenticated to each other.

Figure 2:
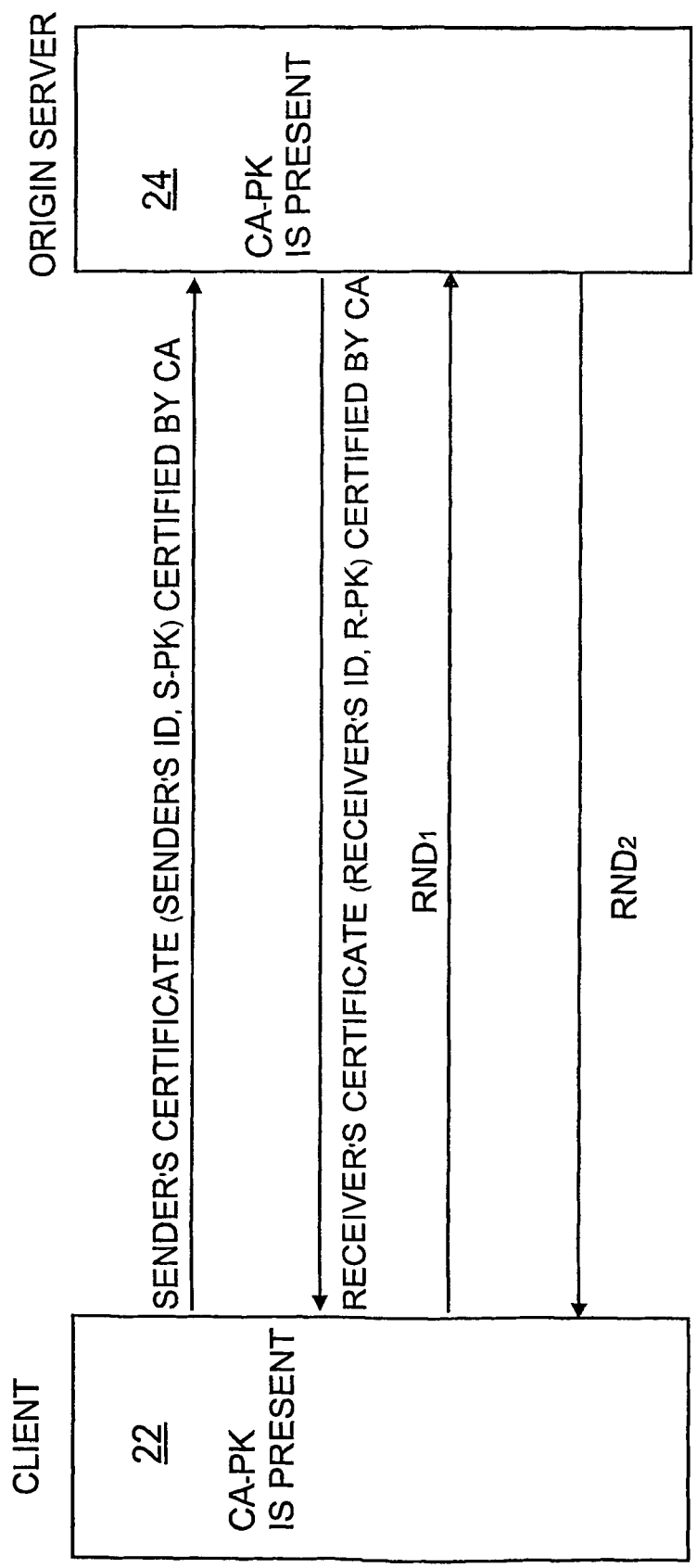

Compared with symmetric-key encryption, public-key encryption requires more computation and is therefore not always appropriate for large amounts of data. Therefore, RSA or some other form of public-key encryption is only used at the protocol handshake part of a communication in order to generate a master secret. This is shown in FIG. 2 in which public key encryption is used to negotiate a session key. Since data communication is bi-directional, in the following reference will be made to a client and a server rather than a sender and a receiver.

Initially, both a client 22 and a server 24 have a public key from a certification authority (CA-PK). The client 22 and the server 24 each go into the certification authority to obtain an authenticated certificate, which is signed by the certification authority's CA-SK. In addition to a public key (for example of the client 22 or the server 24), a certificate includes the name of the entity it identifies (in the form of a distinguished name), an expiration date (validity period), the name of the certification authority (in the form of a distinguished name, referred to as DN in the following) that issued the certificate, a serial number and other information. Most importantly, a certificate always includes the digital signature of the issuing certification authority. The certification authority's digital signature allows the certificate to function as a "letter of introduction" for users who know and trust the certification authority but do not know the entity identified by the certificate.

A DN is a unique identifier for an individual, for example to identify a person or a terminal node. If the DN is included in a digital certificate and the certificate is signed by a trusted CA, it is believed that the identified individual is real and that the individual having the private key corresponding to the public key in the certificate is this real individual. In effect, the certificate issued by the certification authority binds a particular public key in the name of the entity or entities which the certificate identifies. Before a CA signs a certificate it verifies that the individual is the one that is claimed. This verification may include the analysis of the personal identification information, a signature or some other information. In this embodiment, the distinguished name (DN) identifies the client 22 or the server 24.

Although the digital certificate includes all of the elements described in the foregoing, only the public key and the party's DN will be discussed in the following.

Once the authenticated certificates have been exchanged, their signatures can be verified and thus authenticated by the client 22 and the server 24 using the CA-PK in order that each party is enable to obtain the public key of the other. Each party generates a random number ($RND_1$ and $RND_2$) and encrypts it with the other party's public key. The encrypted random numbers are then transmitted to the opposite party and can be decrypted using the private keys. Since both parties now possess both random numbers these can be combined to generate a master secret (also referred to as a session key). Once this has been generated the client 22 and the server 24 can communicate using a relatively fast symmetric-key encryption method such as DES, 3DES or RC5. FIG. 2 is shown and described simply to illustrate the principles involved. Particular implementations of the arrangement of FIG. 2, for example using SSL or WTLS, may be more complicated in practice.

Problems can occur when an encryption method from TCP/IP and from another communication protocol having its own security layer are used together. This situation can occur, for example, when mobile terminals operating according to the Wireless Application Protocol (WAP) are used to access the Internet. In order to provide secure connection the Internet uses security protocol layers like Transport Layer Security (TLS) (specified by RFC 2246) and Secure Sockets Layer (SSL) (a de facto standard developed by Netscape Corporation). The equivalent security protocol layer used in WAP networks is Wireless Transport Layer Security (WTLS) (standardized by the WAP Forum).

Although Internet and WAP networks are very similar, they are not compatible and so it is necessary to carry out content translation between Hypertext Markup Language (HTML) and Wireless Markup Language (WML) and between HTTP and WSP layers. The problem is illustrated with reference to FIG. 3. A WAP stack 32 (embodied in a client) is connected to a TCP/IP stack 34 (embodied in a server) via a gateway 36. The WAP stack 32 has protocol layers Wireless Datagram Protocol (WDP), Wireless Transport Layer Security (WTLS), Wireless Transaction Protocol (WTP) and Wireless Session Protocol (WSP). It provides WML content. The TCP/IP stack 34 has protocol layers Internet Protocol (IP), Transaction Control Protocol (TCP), Secure Sockets Layer (SSL) and Hypertext Transport Protocol (HTTP). It provides HTML content.

In the case of WAP and TCP/IP stacks, if the WTLS and SSL layers are active, and the gateway 36 does not possess the necessary keys to decrypt messages which are being transmitted, layers located above the encryption layers cannot be modified in the gateway and thus conversion between them (between WSP and HTRP or between WML and HTML) is not possible. Since the gateway cannot access the required secret keys (usually they are stored in a physically tamper-resistant device in a way that they cannot be read out from them), another encryption scheme should be used. The client should authenticate the gateway and the gateway should authenticate the origin server and the server should authenticate the gateway and the gateway should authenticate the client. In this scheme it is necessary that both parties trust the gateway. Since current security protocols (SSL, TLS, WTLS) are assuming end-to-end encrypted connections they cannot support this kind of encryption scheme.

According to a first aspect of the invention there is provided a method for authenticating a first party and a second party to each other via a gateway, the method comprising the steps of:
providing the gateway with a gateway public key and a corresponding gateway private key;
providing the first party and the gateway with a common public key to authenticate the source of information transferred from one to the other; and
providing the second party with the gateway public key to authenticate information received from the gateway, the gateway public key being different to the common public key.

Preferably the first party is a client. Preferably the second client is a server.

Preferably the second party is told that the gateway public key is a public key from a certification authority. Therefore, when the second party receives a certificate from the gateway which has been signed by the gateway private key, the second party uses the gateway public key to verify that this signed certificate has come from the same source as the gateway public key and consequently accepts as if the certificate has come from the certification authority. In this way, the gateway is able to include information in the certificate that it sends to the second party to convince the second party that the gateway is, in fact, the first party.

Preferably the common public key is the public key of a real and trusted certification authority.

According to a second aspect of the invention there is provided a method of authenticating a first party to a second party via a gateway the first party using an encryption protocol between itself and the gateway and the second party using an encryption protocol between itself and the gateway the method comprising the steps of:

installing in the second party that the gateway is a trusted certification authority;

the gateway issuing a digital certificate authenticating the first party; and the second party verifying the digital certificate in order to confirm to the second party that the digital certificate comes from the trusted certification authority.

Preferably the encryption protocols between the first party and the gateway and between the second party and the gateway are different. Preferably the encryption protocol between the first party and the gateway is WTLS. Preferably the encryption protocol between the gateway and the second party is SSL.

According to a third aspect of the invention there is provided a method for authenticating a client and a server to each other via a gateway, the method comprising the steps of:

providing the client with a client public key and a corresponding client private key;

providing the client with a client certificate;

providing the server with a server public key and a corresponding server private key;

providing the server with a server certificate;

providing the gateway with a gateway public key and a corresponding gateway private key; and providing the gateway with a gateway certificate.

Preferably the client certificate is issued by a common CA. Preferably the client certificate contains the client's distinguished name and the client public key. The client certificate may be signed, and thus authenticated, by a trusted certificate authority.

Preferably the server certificate contains the server's distinguished name and the server public key. It may also contain other items of information. This server certificate is signed and thus authenticated by a trusted certificate authority. Preferably this certificate authority is the same as that which signed the client certificate. Alternatively it may be a different certification authority.

Preferably the gateway certificate contains the server's distinguished name and the gateway public key. This gateway certificate may be signed and thus authenticated by a trusted certificate authority. Preferably this certificate authority is the same as that which signed the server certificate. Alternatively it may be a different certification authority. The trusted certificate authority may sign the gateway certificate (containing the server's distinguished name) only if the server and the gateway belong to the same organization, since only one organization may possess the same distinguished name for different public keys.

Preferably the gateway simulates a certification authority. Preferably the gateway public key provided to the server is indicated to the server as being the public key of a certification authority. Preferably the gateway generates different public private key-pairs for every client, each key-pair comprising a generated client public key and a generated client private key. The gateway may generate different certificates in the name of different clients The gateway may sign these certificates with the gateway private key. Preferably these certificates contain the distinguished name of the client and the generated client public key. As an extension these generated client certificates may include the original client certificate in order for the server to get the authentic client public key.

Preferably the method comprises the step of providing the server with an identifier indicating its origin. Preferably it comprises the step of providing the gateway with an identifier indicating a common origin with the server. Preferably it comprises the step of requesting certificates for the server and the gateway corresponding to the common identifier of the server and the gateway, but containing different public keys belonging to the server and to the gateway respectively.

Preferably the method comprises a handshake in order to authenticate each party to the other and to negotiate one or more session keys. This may be a double handshake. In one embodiment, the client and the gateway execute a common first handshake authenticating each other (using the client certificate and the gateway certificate) and negotiating a master secret (from which a session key can be calculated). Once the client is authenticated to the gateway the gateway may use the generated client private key and the generated client certificate belonging to the authenticated client to execute a second handshake with the server (at the server side the server uses its server certificate). These two handshakes may overlap each other. As a result of the second handshake the gateway and the server may negotiate a common master secret (from which the session key can be calculated).

In this way, the invention provides that the client accepts the authentication from the gateway, because in the gateway certificate the server's distinguished name is included and the certificate is signed by a trusted certificate authority. Furthermore, the server accepts the authentication from the gateway, because in the generated client certificate the client's distinguished name is included and the certificate is signed by the gateway, which the server accepts as a trusted certificate authority.

The handshake may be a handshake which occurs prior to communication according to WTLS. It may be a handshake prior to SSL or TLS. Preferably it comprises a handshake procedure prior to communication by both WTLS and SSL or TLS.

The invention may also be considered to be a method of translating encrypted content according to a first protocol into content according to a second protocol or to be a method for enabling such translation to occur. Such a method requires each party to be authenticated to the other via an intermediate gateway and so can use the methods of authentication according to the previous aspects of the invention.

According to a fourth aspect of the invention there is provided a transaction system comprising a first party and a second party which communicate via a gateway communication between the parties requiring authentication of the first party to the second party using an encryption protocol between the first party and the gateway and an encryption protocol between the second party and the gateway wherein:

the gateway comprises digital certificate signing means to issue a digital certificate authenticating the first party;

the second party comprises digital certificate verification means corresponding to the digital certificate signing means of the gateway which verifies the digital certificate in order to confirm to the second party that the gateway signed digital certificates are authentic.

Preferably the transaction system is a communications system.

According to a fifth aspect of the invention there is provided a gateway through which a first party and a second party can communicate, communication between the parties requiring authentication of the first party to the second party using an encryption protocol between the first party and the gateway and an encryption protocol between the second party and the gateway, the gateway comprising digital certificate signing means to issue a digital certificate authenticating the first party the signing means of the gateway corresponding to verification means of the second party which verifies the digital certificate in order to confirm to the second party that the gateway signed digital certificates are authentic.

According to a sixth aspect of the invention there is provided a computer program product for authenticating a first party to a second party via a gateway the first party using an encryption protocol between itself and the gateway and the second party using an encryption protocol between itself and the gateway the computer program product comprising:

computer executable code means to indicate to the second party that the gateway is a trusted certification authority;
computer executable code means to enable the gateway to issue a digital certificate authenticating the first party; and
computer executable code means to enable the second party to verify the digital certificate in order to confirm to the second party that the digital certificate was issued by a trusted certification authority.

According to a seventh aspect of the invention there is provided a method of content delivery from a content provider to a terminal through a communications network in which the content provider and the terminal authenticate each other via a gateway, the method comprising the steps of:

providing the gateway with a gateway public key and a corresponding gateway private key;
providing the terminal and the gateway with a common public key to authenticate the source of information transferred from one to the other; and
providing the content provider with the gateway public key to authenticate information received from the gateway, the gateway public key being different to the common public key.

According to an eighth aspect of the invention there is provided a method of content delivery from a content provider to a terminal through a communications network in which the content provider and the terminal authenticate each other via a gateway the terminal using an encryption protocol between itself and the gateway and the content provider using an encryption protocol between itself and the gateway the method comprising the steps of:

the content provider determining that the gateway is a trusted certification authority;
the gateway issuing a digital certificate authenticating the terminal; and
the content provider verifying the digital certificate in order to confirm to the content provider that the digital certificate comes from the trusted certification authority.

According to a ninth aspect of the invention there is provided a method of content delivery from a content provider to a terminal through a communications network in which the content provider and the terminal authenticate each other via a gateway the method comprising the steps of:

providing the client with a client public key and a corresponding client private key;
providing the client with a client certificate;
providing the server with a server public key and a corresponding server private key;
providing the server with a server certificate;
providing the gateway with a gateway public key and a corresponding gateway private key; and
providing the gateway with a gateway certificate.

The invention is suitable for telecommunications, and is particularly suitable for mobile terminals, such as mobile telephones, personal digital assistants, e-books or browsers. It is applicable to securely accessing the Internet by using mobile terminals. In one embodiment it can be used for providing end-to-end security between a mobile terminal using Wireless Application Protocol (WAP) and a WWW server using Internet security protocols.

Figure 3:
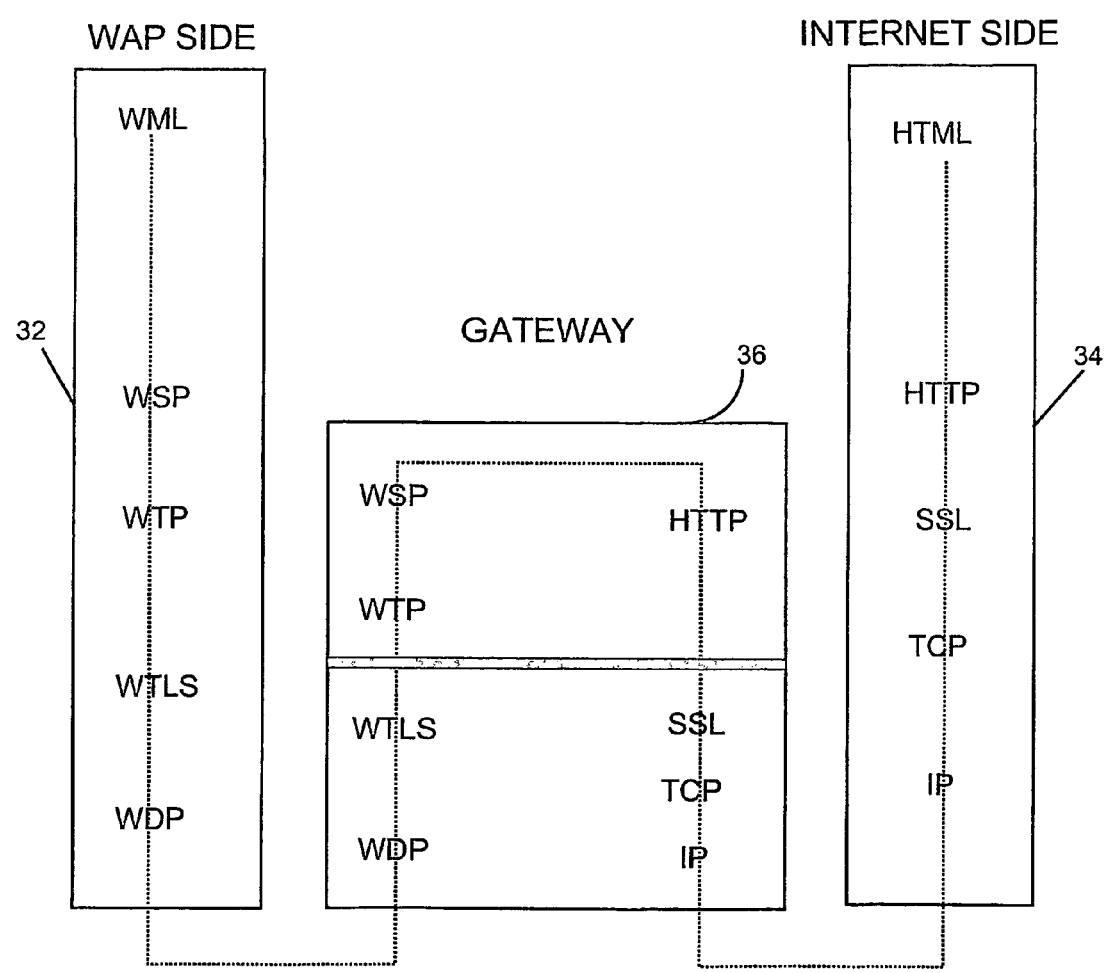
Figure 4:
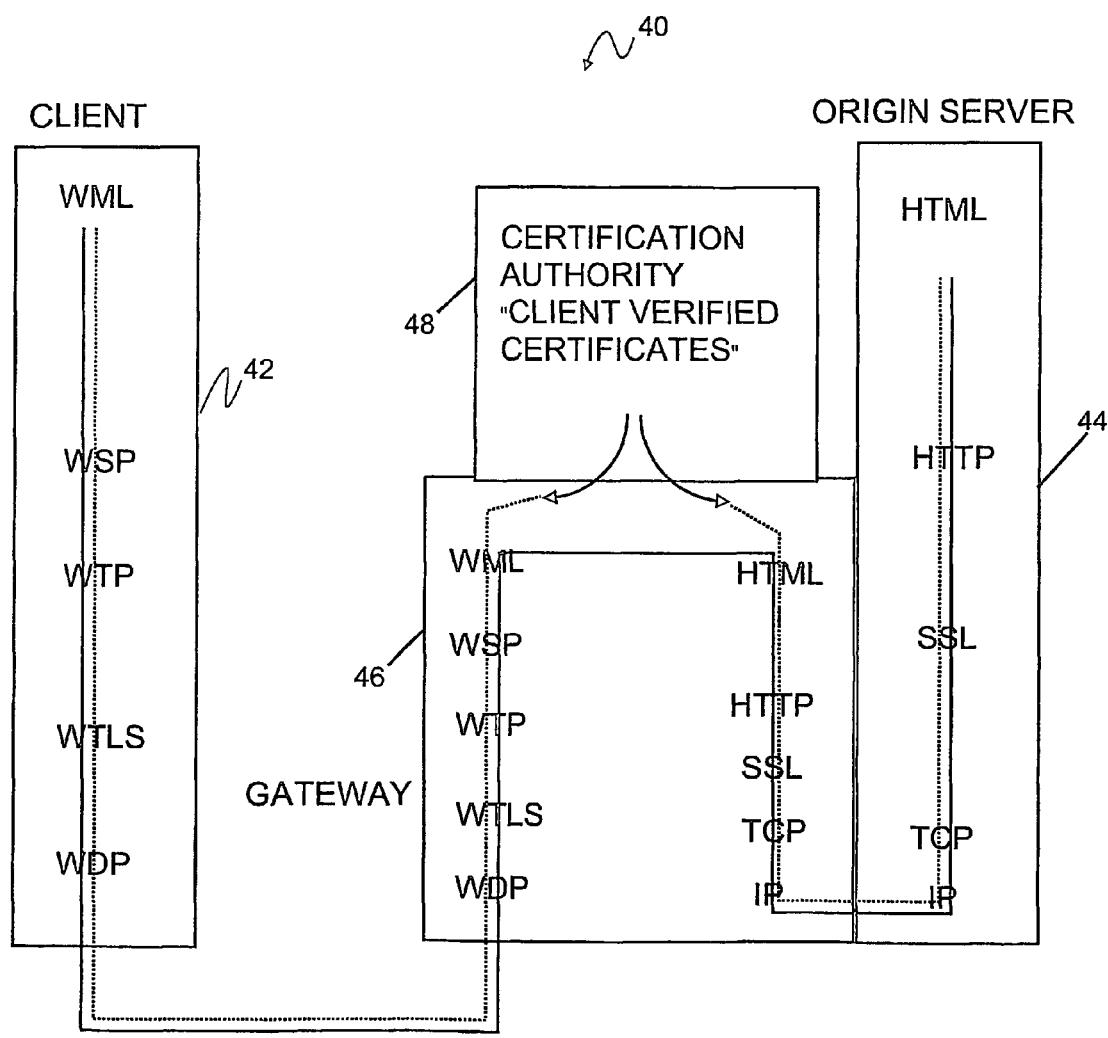
Figure 5:
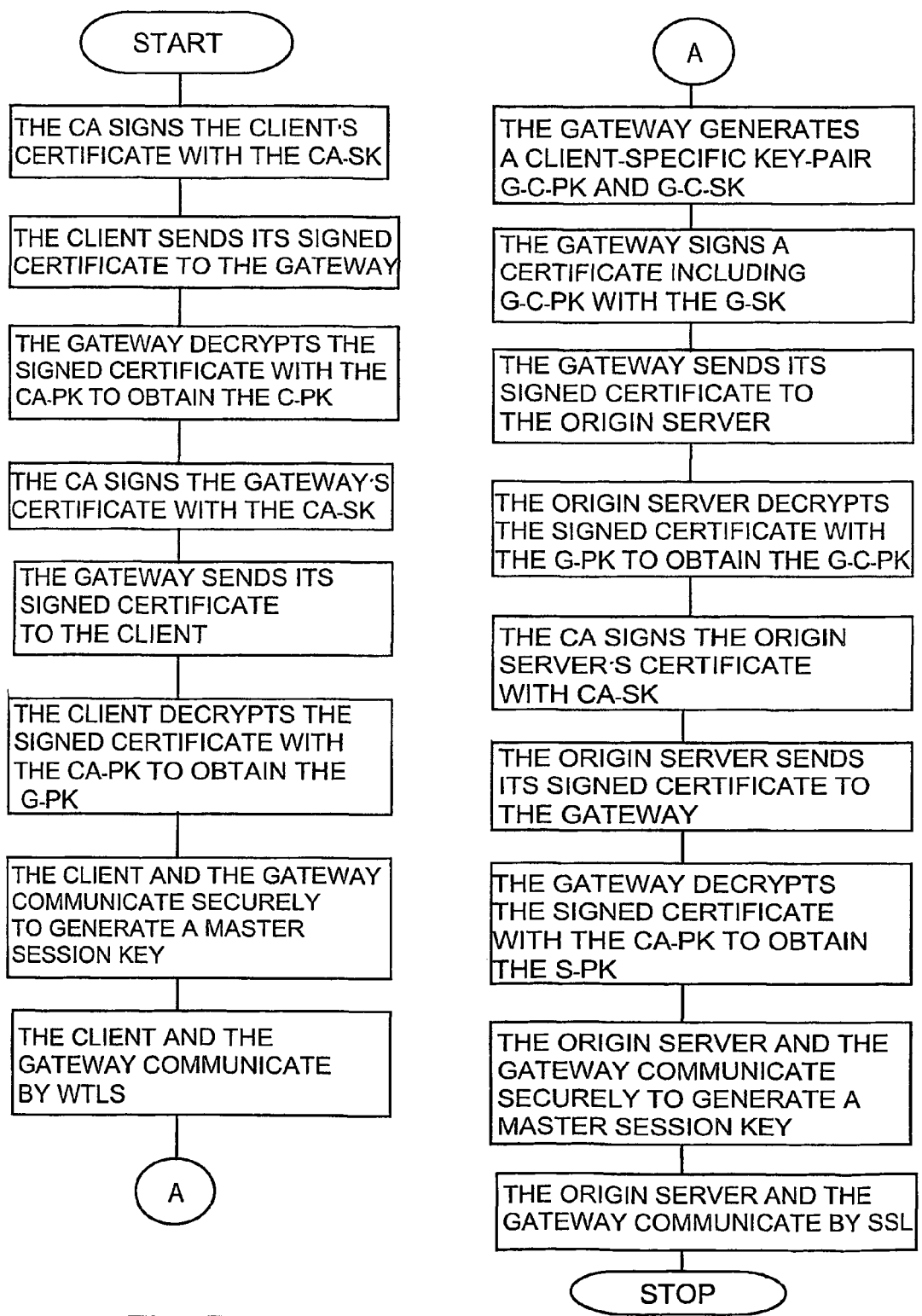

An embodiment of the invention will now be described with reference to the accompanying drawings in which:

FIG. 1 shows communication between a sender and a receiver;
FIG. 2 shows steps in generating a master secret;
FIG. 3 shows communication via a gateway;
FIG. 4 shows communication via a gateway according to the invention; and
FIG. 5 shows a flowchart of steps.

FIG. 4 shows a communications system 40 comprising a client 42 (such as a mobile telephone) having a WAP stack, an origin server 44 having a TCP/IP stack, a gateway 46 and a certification authority (CA) 48. The gateway 46 is owned by the operator of the origin server 44, that is the origin server 44 and the gateway 46 are under common control. The CA 48 is accessible by the client 42, the origin server 44 and the gateway 46 for authentication of a certificate belonging to each of these parties. The origin server 44 is located in a communications network. In this embodiment of the invention, it is located in a wireless telecommunications network.

The CA 48 is an independent authority. It issues a digital certificate certifying that a party has proved its identity to the CA. Since each party trusts the CA, they accept digital certificates which have been digitally signed by the CA which show that the other parties have been personally identified by the CA. The CA 48 has a private and public key pair CA-SK and CA-PK.

The client 42 has a key pair comprising a public key (C-PK) and a private key (C-SK). It has a certificate comprising the following information:
(i) the C-PK;
(ii) a validity period for the certificate;
(iii) the client's DN;
(iv) the issuer's DN (the CA's DN); and
(v) digital signature of the above information signed by the issuer's private key (the CA-SK).

The client 42 also has the CA-PK from the CA 48. This may be pre-installed, for example on manufacture of the client or manufacture of a part of the client (for example manufacture or configuration of a SIM card), or it may be installed at a later date.

The origin server 44 has a key pair comprising a public key (S-PK) and a private key (S-SK). It has a certificate comprising the following information:
(i) the S-PK;
(ii) a validity period for the certificate;
(iii) the origin server's DN,
(iv) the issuer's DN (the CA's DN); and
(v) digital signature of the above information signed by the issuer's private key (CA-SK).

Instead of having the CA-PK from the CA 48, the origin server 44 has a public key from the gateway 46 as will be explained below.

The gateway 46 has a key pair comprising a public key (G-PK) and a private key (G-SK). It has a certificate comprising the following information:
(i) the G-PK;
(ii) a validity period for the certificate;
(iii) the gateway's DN (which is the same or at least belongs to the same organization as the server);
(iv) the issuer's DN (the CA's DN); and
(v) digital signature of the above information signed by the issuer's private key (CA-SK).

The gateway 46 also has the CA-PK from the CA 48. The CA-PK is presented to the gateway 46 in a trustworthy way. For example, the CA-PK may be loaded into the gateway 46 by floppy disk.

The above relates to an embodiment in which all certificates are issued by the same CA. However, there may be several CAs. For example, there may be a CA-C which signs the client's certificate with a private key CA-C-SK, a CA-G which signs the gateway's certificate with a private key CA-G-SK and a CA-S which signs the server's certificate with a private key CA-S-SK. The public keys CA-C-PK and CA-S-PK are given to the gateway and the public key CA-G-PK is given to the client. The gateway public key G-PK is given to the server.

As is mentioned above, the G-PK is loaded into the origin server 44 rather than the CA-PK. The origin server 44 is informed that G-PK is actually the CA-PK. Since the origin server 44 and the gateway 46 are under control of the same organization and may be located in the same (physically protected) location (and perhaps even in the same machine), loading the CA-PK into the gateway 46 and the G-PK into the origin server 44 as the CA-PK is straightforward. The public keys may be loaded directly or may be provided over a connection. All that is important is that the G-PK should be downloaded in an authentic way.

It may be the case that the origin server 44 and the gateway 46 are not under the control of the same organization. This would result in a lower level of security although this might be acceptable in certain circumstances.

It should be understood that, in the certificates of the origin server 44 and the gateway 46, extensions such as the validity period and the issuer's DN are identical. In addition, the origin server's DN and the gateway's DN are identical. However, in one embodiment of the invention, the gateway's DN and the origin server's DN differ slightly but are identical enough to indicate that the DNs represent the same organization. For example, the origin server's DN may represent a bank server and the gateway's DN may represent another server within the same bank.

Operation of the system will now be described with reference to the flowchart of steps of FIG. 5. A protocol handshake is executed between the client 42 and the gateway 46 as follows. The client's certificate (signed by the CA-SK of the CA 48) is sent to the gateway 46. The gateway 46 is able to verify this signed certificate by using the CA-PK and thus it obtains the C-PK, the origin of which is authenticated by the CA 48. In response, the gateway 46 sends its certificate (signed by the CA-SK) to the client 42. The client 42 is able to verify this signed certificate by using the CA-PK and thus it obtains the G-PK, the origin of which is authenticated by the CA 48. Since the gateway certificate has the origin server's DN, the client believes that the gateway 46 is the origin server 44. Since the client 42 and the gateway 46 each have the public key of the other, they can communicate in a way which is authentic and confidential and agree on a master secret according to the security protocol which is to be used (for example WTLS). The client 42 and the gateway 46 can now communicate by using WTLS encryption.

A protocol handshake is now executed between the origin server 44 and the gateway 46 as follows. The gateway 46 generates a public key G-C-PK and a private key G-C-SK pair for each client. It is preferred to use a client-specific key-pair in order to provide different keys for different clients (for the purposes of non-repudiation).

The gateway 46 generates a new certificate including the generated client public key (G-C-PK) and the client's DN. The new certificate is signed by the G-SK of the gateway 46 and is sent to the origin server 44. In this way, the gateway 46 generates a certificate that the origin server will accept as if it came from the client. The origin server 44 is able to verify this signed certificate by using the G-PK and thus it obtains the generated client public key (G-C-PK) and the client's DN. (Note: since the gateway 46 does not participate in the certification hierarchy, this certificate will only be accepted by the origin server 44 and will be invalid to any other party, so the gateway 46 cannot impersonate the client in other situations.)

Therefore, the origin server 44 believes that it is communicating with the client 42 because the generated client certificate has the client's DN and the internal variables of the SSL layer indicate that there is a secure connection to the client. In this way programs at the application level in the origin server 44 will not notice any differences and will accept the authentication. The gateway believes that client's DN relates to a party that it should trust because the original client certificate is signed by a trusted CA The origin server 44 has had its certificate signed by the CA-SK and sends this signed certificate to the gateway 46. The gateway 46 is able to verify this signed certificate by using the CA-PK and thus it obtains the S-PK, the origin of which is authenticated by the CA 48.

Since the origin server 44 has the generated client public key of the gateway (in this case G-C-PK) and the gateway 46 has the public key of the origin server (S-PK), the origin server 44 and the gateway 46 can communicate in a secure way and agree on a master secret in a way similar to that described above in relation to FIG. 2. The origin server 44 and the gateway 46 can now communicate using SSL (or TLS) encryption.

Therefore, following the procedure discussed above, the client 42 and the origin server 44 can now both communicate securely with the gateway 46. Messages sent by either can be decrypted by the gateway 46, translated between WML and HTML in the gateway 46, and then re-encrypted in the name of the sender before being sent to the intended recipient. The gateway 46 is treated by both the client 42 and the origin server 44 as a trusted interpreter in that both parties will talk directly to it over an SSL or WTLS secure connection.

It should be noted in the foregoing that the gateway 46 operates in relation to the origin server 44 as a certification authority. However, it should be noted that in this role, the gateway 46 does not participate in the certification hierarchy and does not operate as an official certification authority to other parties except the server 44. On the other hand the gateway 46 operates in relation to the client 42 as a server and has a signed certificate from a real certification authority, that is the CA 48. The origin server 44 and the gateway 46 are under common control and so the origin server 44 can trust the gateway 46 and the client can accept that they belong to the same organization.

In a preferred embodiment, the gateway 46 runs on the same machine as the origin server 44, that is, it has the same IP address, distinguished name and certification. In this case, the client 42 will not notice anything unusual about the translation.

If speed of establishing secure communication between the client 42 and the origin server 44 is important, scalable hardware-based algorithms can be used in the gateway. Alternatively or additionally, generated client keys could be calculated before the actual handshake.

In the same way that a client-specific key-pair can be used between the gateway and the server, a server-specific gateway can be used between the client and the gateway. This could be the case if there are a number of different keys for different servers.

Since the gateway decrypts and encrypts all messages, for certain operations, such as making payments, it may be preferred to use another application level solution. In this case, the gateway 46 may insert the client's original certification into the generated client-certification as an attachment, so that real end-to-end authentication above the application level may be performed. The original certificate may then be used for evaluating digital signatures.

One can easily see that this solution is independent from the differences between WTLS and SSL and works also in cases where the client or the server or both are not authenticated. In other words, in SSL AND WTLS, client or server side authentication is optional. If we disable one of these authentications the approach provided by the invention will also be able to handle that case.

An advantage of the invention is that it does not require changes to be made either in WAP communication between the client 42 and the gateway 46 or in TCP/IP communication between the origin server 44 and the gateway 46. In this way it is compatible with appropriate standards.

The invention provides end-to-end security between Internet servers and WAP clients in a way which enables seamless conversion between the SSL and the WTLS layers of the respective protocol stacks.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method comprising:
   a gateway computer receiving a first party certificate from a first party, said first party certificate being signed and including a name identifying said first party;
   in response to receiving said first party certificate, said gateway computer generating a new first party certificate, different from a certificate generated for the first party by a certificate authority, said new certificate including said name identifying said first party, but also including a gateway-generated first party public key, and said gateway computer signing said new certificate using a gateway private key;
   supplying said new certificate from the gateway computer to a second party, the new certificate identifying the gateway as the first party, the first party being different from the gateway computer;
   using said first party certificate to establish a first secure communication link between said first party and said gateway computer; and
   using said new certificate to establish a second secure communication link between said second party and said gateway computer, and wherein said gateway computer uses said first and second communication links to conduct secure communications between said first and second parties.

2. The method according to claim 1, wherein: encryption protocols of the first secure communication link between the first party and the gateway computer and the second secure communication link between the second party and the gateway computer are different.

3. The method according to claim 2 wherein: an encryption protocol of the first secure communication link between the first party and the gateway computer is wireless transport layer security and an encryption protocol of the second secure communication link between the gateway computer and the second party is secure sockets layer.

4. The method according to claim 1, further comprising: indicating to the second party that the provided gateway-generated first party public key is the public key of a trusted certification authority.

5. The method according to claim 1, further comprising: the gateway computer generating different public-private key-pairs for a plurality of first parties, each key-pair comprising a generated first party public key and a generated first party private key.

6. The method according to claim 5, further comprising: the gateway computer generating different certificates in the names of different first parties.

7. The method according to claim 6, further comprising: the gateway computer signing said different certificates with said gateway private key.

8. The method according to claim 7, wherein: the different certificates contain a distinguished name of a corresponding first party and its first party public key.

9. The method according to claim 1, comprising: the gateway computer receiving an identifier indicating a common origin with the second party.

10. The method according to claim 9, comprising: requesting certificates for the second party and the gateway computer corresponding to the common identifier of the second party and the gateway computer, but containing different public keys belonging to the second party and to the gateway computer.

11. The method according to claim 1, comprising: performing a handshake in order to authenticate each party to the other and to negotiate one or more session keys.

12. The method according to claim 11, wherein: the handshake is a double handshake.

13. The method according to claim 1, wherein: the first party and the gateway computer execute a common first handshake authenticating each other and negotiate a master secret.

14. The method according to claim 13, further comprising: the gateway computer using a first party private key and the first party certificate to execute a second handshake with the second party.

15. The method according to claim 14, wherein: at least one of the handshakes is a handshake which occurs prior to communication according to wireless transport layer security.

16. The method according to claim 14, wherein: at least one of the handshakes is a handshake which occurs prior to communication according to secure sockets layer or transport layer security.

17. The method according to claim 1, wherein: the first party is a client and the second party is a server.

18. The method according to claim 1, comprising: providing the first party and the gateway computer with a common public key to authenticate a source of information transferred from one to the other wherein the common public key is the public key of a trusted certification authority.

19. A method, comprising:
   establishing a first secure communication session between a client and a gateway computer by the gateway computer providing said client with a signed certificate identifying the gateway computer as a server, the gateway computer being different from the server;
   establishing a second secure communication session between said server and said I gateway computer by providing said server with a second signed certificate identifying the gateway computer as the client, the gateway computer being different from the client; and prior to establishing the second secure communication session, said gateway computer generating a public/private key pair for said client, generating the second signed certificate containing said public key for said client and being signed by a private key of the gateway, the second signed certificate being different from a certificate generated for the client by a certificate authority, and sending said second signed certificate to said server to establish the second secure communication session.

20. The method of claim 19, further comprising the following performed by the gateway computer:
receiving a message from the client directed to said server;
decrypting said message according to encryption of said first secure communication session;
performing data conversion on contents of said decrypted message;
encrypting said converted contents according to encryption of said second secure communication session; and
transmitting said encrypted converted contents to said server.

21. An apparatus comprising:
a gateway computer configured to:
establish a first secure communication session between a client and said gateway computer by providing said client with a signed certificate identifying the gateway computer as a server, the gateway computer being different from the server;
establish a second secure communication session between said server and said gateway computer by providing said server with a second signed certificate identifying the gateway computer as the client, the gateway computer being different than the client;
generate a public/private key pair for said client;
generate, prior to establishing the second secure communication session, the second signed certificate containing said public key for said client and being signed by a private key of the gateway computer, the second signed certificate being different from a certificate generated for the client by a certificate authority; and
transmit the second signed certificate to the server to establish the second secure communication session.

22. The apparatus of claim 21, wherein the gateway computer is further configured to:
receive a message from the client directed to said server;
decrypt said message according to encryption of said first communication session;
perform data conversion on contents of said decrypted message;
encrypt said converted contents according to encryption of said second communication session; and
transmit said encrypted converted contents to said server.

* * * * *